United States Patent
Lou et al.

(10) Patent No.: US 9,684,981 B2
(45) Date of Patent: Jun. 20, 2017

(54) METHOD, APPARATUS, AND STORAGE MEDIUM FOR RECONSTRUCTING CARDIAC IMAGE

(71) Applicant: Shenyang Neusoft Medical Systems Co., Ltd., Shenyang (CN)

(72) Inventors: Shanshan Lou, Shenyang (CN); Han Zheng, Shenyang (CN)

(73) Assignee: SHENYANG NEUSOFT MEDICAL SYSTEMS CO., LTD, Shenyang (CN)

( * ) Notice: Subject to any disclaimer, the term of this patent is extended or adjusted under 35 U.S.C. 154(b) by 37 days.

(21) Appl. No.: 14/811,820

(22) Filed: Jul. 28, 2015

(65) Prior Publication Data

US 2016/0035112 A1    Feb. 4, 2016

(30) Foreign Application Priority Data

Jul. 29, 2014 (CN) .......................... 2014 1 0366323

(51) Int. Cl.
  *G06K 9/00* (2006.01)
  *G06T 11/00* (2006.01)
(52) U.S. Cl.
  CPC ....... *G06T 11/005* (2013.01); *G06T 2211/412* (2013.01)
(58) Field of Classification Search
  CPC ..... G06T 2211/412; G06T 2207/30048; A61B 6/541
  See application file for complete search history.

(56) References Cited

U.S. PATENT DOCUMENTS 5,383,231 A *  1/1995 Yamagishi ............. A61B 6/032
                                            378/15
2002/0181645 A1* 12/2002 Bruder ................... A61B 6/481
                                            378/8
(Continued)

FOREIGN PATENT DOCUMENTS

CN     1833181 A    9/2006
CN   101301207 A   11/2008
CN   103260519 A    8/2013

OTHER PUBLICATIONS

Office Action mailed Aug. 17, 2016 for Chinese Application No. 201410366323.2 filed Jul. 29, 2014; all pages.
(Continued)

*Primary Examiner* — Gandhi Thirugnanam
(74) *Attorney, Agent, or Firm* — Kilpatrick Townsend & Stockton LLP (57) ABSTRACT

A method includes: collecting projection data and recording electrocardiogram data when computed tomographic scanning is performed on a patient, selecting, from the projection data and based on the electrocardiogram data, first projection data related to each cardiac pixel in a same phase, and reconstructing, based on the first projection data, an image of the related cardiac pixel, to obtain a cardiac image; determining, based on the electrocardiogram data, a reconstruction phase of each reconstruction pixel in a first reconstruction region, where the first reconstruction region is an image region selected along the patient's head-to-foot direction from the cardiac image; and selecting, based on the reconstruction phase of each reconstruction pixel and from the projection data, second projection data related to the reconstruction pixel in the reconstruction phase, and reconstructing, based on the second projection data, an image of the reconstruction pixel.

12 Claims, 5 Drawing Sheets

(56) References Cited

U.S. PATENT DOCUMENTS

| | | | |
|---|---|---|---|
| 2003/0123718 A1* | 7/2003 | Edic | G06T 11/005 382/131 |
| 2004/0019275 A1* | 1/2004 | Iatrou | G06T 11/005 600/428 |
| 2004/0236219 A1* | 11/2004 | Liu | G01S 7/52034 600/437 |
| 2005/0058238 A1* | 3/2005 | Flohr | A61B 6/032 378/8 |
| 2005/0135558 A1* | 6/2005 | Claus | A61B 6/02 378/42 |
| 2008/0101532 A1* | 5/2008 | Tkaczyk | A61B 6/541 378/8 |
| 2008/0170654 A1* | 7/2008 | Tkaczyk | A61B 6/032 378/8 |
| 2008/0205722 A1* | 8/2008 | Schaefer | G06T 7/0081 382/128 |
| 2008/0267480 A1* | 10/2008 | Nielsen | G06T 11/006 382/131 |
| 2009/0010519 A1* | 1/2009 | Wakai | G06F 19/321 382/131 |
| 2009/0141935 A1* | 6/2009 | Grass | A61B 6/032 382/103 |
| 2009/0290774 A1* | 11/2009 | Shechter | G06T 11/005 382/131 |
| 2011/0218438 A1* | 9/2011 | Hsieh | A61B 34/20 600/443 |
| 2012/0093281 A1* | 4/2012 | Zamyatin | A61B 6/032 378/15 |
| 2012/0099768 A1* | 4/2012 | Helm | A61B 6/4405 382/128 |
| 2012/0189185 A1* | 7/2012 | Chen | G06T 7/0083 382/131 |
| 2013/0039457 A1* | 2/2013 | Hiraoka | A61B 6/541 378/8 |
| 2016/0035112 A1* | 2/2016 | Lou | G06T 11/005 382/131 |

OTHER PUBLICATIONS

Wang; "Application and prospect of clinical three-dimensional echocardiography"; Radio Practice; May 2000; vol. 15, No. 3; pp. 168-169; English Summary (the First paragraph of this article, provided by Google translate).

Feng, et al.; "Use of low-dose adaptive sequence scan of dual-source CT in coronary angiography for arrhythmia: An preliminary study"; Department of Radiology, Intensive Care Unit, Department of Cardiology, Zhejiang Hospital, Hangzhou 310013, China; Med J Chin PLA, vol. 38, No. 4; Apr. 1, 2013; pp. 320-323.

Qiu, et al.; "Advances in CT coronary angiography for patient with arrhythmia"; Chinese Journal of Cardiovascular Research; Apr. 2010, vol. 8, No. 4; English Summary (the First paragraph of this article, provided by Google translate).

Herzog, et al.; "Multi-detector row CT coronary angiography: Influence of reconstruction technique and heart rate on image quality"; Radiology: vol. 238: No. 1; Jan. 2006; pp. 75-86.

* cited by examiner

METHOD, APPARATUS, AND STORAGE MEDIUM FOR RECONSTRUCTING CARDIAC IMAGE

This application claims priority to Chinese Patent Application No. 201410366323.2, titled "METHOD AND APPARATUS FOR RECONSTRUCTING CARDIAC IMAGE", filed with the Chinese State Intellectual Property Office on Jul. 29, 2014, which is incorporated by reference in its entirety herein.

BACKGROUND

With the development of the medical Computed Tomography (CT) technology, the reconstructed cardiac image by a CT technology becomes a hot spot. A method of a reconstructed cardiac image is a core of the CT technology. With different reconstruction techniques, different effects are produced to CT cardiac images reconstructed based on same CT projection data. Therefore, a reconstruction method has a direct effect on quality of a reconstructed cardiac image.

For a reconstructed cardiac image by using a conventional cardiac reconstruction algorithm, all pixels of the cardiac image have a same phase. However, according to the nature of physiological heart motion, the physiological heart beating is not uniform. That is, motions at different positions of a heart are different. Phenomena such as motion artifact and vascular discontinuity may appear in some positions in a reconstructed image if the cardiac image is reconstructed by using a same reconstruction phase. Therefore, based on analysis of the reconstructed cardiac image, a doctor may make an inaccurate diagnosis for a patient.

DETAILED DESCRIPTION

According to some examples of the present disclosure, in order to alleviate problems of a reconstructed cardiac image such as motion artifact, the phases of various reconstructed image positions (or a region in a sectional reconstructed image) set by a doctor can be adjusted based on a cardiac image reconstructed in a same phase, and appropriate projection data are selected based on said phase information to adjust the cardiac image. The reconstructed cardiac image in this way (or different pixels in the same image) may have different phases, and the cardiac image having different phases is more clear and accurate. Accordingly, it is beneficial to improve accuracy of diagnosis made by the doctor for a patient.

Figure 1:
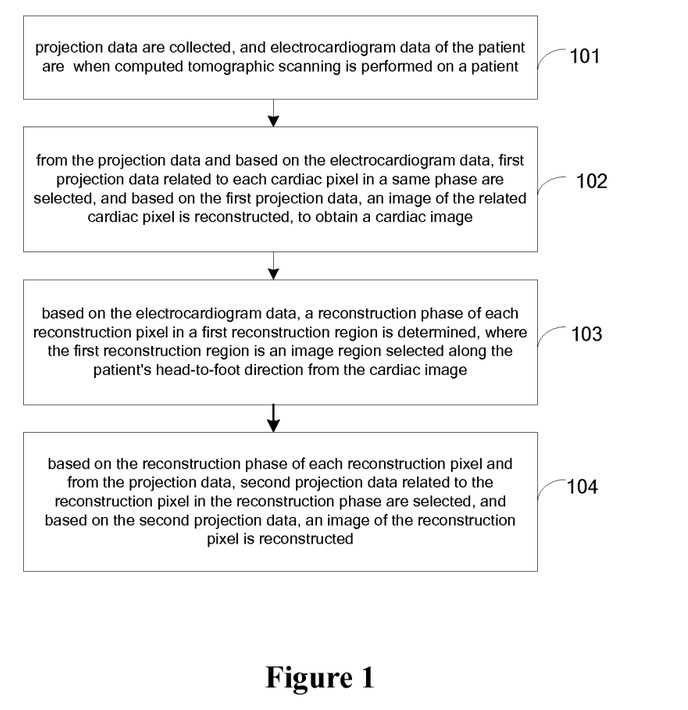
FIG. 1 is a first schematic flowchart of a method for reconstructing a cardiac image according to an example of the present disclosure.

Reference is made to FIG. 1, which is a first schematic flowchart of a method for reconstructing a cardiac image according to an example of the present disclosure. The method includes:

block 101, projection data are collected and electrocardiogram data are recorded when computed tomographic scanning is performed on a patient.

In this block, a heart is scanned completely by a normal cardiac scanning process to acquire scanning data (i.e., projection data). Specifically, a doctor inputs information of a patient and then scans a positioning image to get a position which will be scanned, i.e., the heart. After contrast medium is injected into a blood vessel of the patient, spiral scanning is performed based on a HU (Hounsfield unit, which is a measurement unit for measuring a density of a local tissue or an organ in a human body) threshold of the blood vessel to collect scanning data. Electrocardiogram data of the patient during scanning are also recorded and stored during the scanning of the heart.

block 102, first projection data corresponding to each cardiac pixel in a same phase are selected from said collected projection data based on the electrocardiogram data, and a cardiac image is reconstructed based on the first projection data.

Phases of the heart at different scanning time can be known based on the electrocardiogram data, for example, typical phases include a diastole and a systole. In block 102, for image reconstruction of each cardiac pixel, a same fixed phase (e.g, the diastole or the systole) is first selected based on the electrocardiogram data, and then the period of the electrocardiogram data collection corresponding to the fixed phase is determined Subsequently, the period of said projection data collection corresponding to the time of the electrocardiogram data collection is determined, and finally said projection data collected in the period in the projection data collection are used to reconstruct the corresponding pixel in a cardiac image. Accordingly, the period in the electrocardiogram data collection and the period in the projection data collection are temporally matched to obtain projection data for each pixel. Thus an original cardiac image in the same phase is reconstructed based on these projection data.

block 103, a reconstruction phase of each reconstruction pixel in a first reconstruction region is determined based on the electrocardiogram data, wherein the first reconstruction region is an image region selected along the patient's head-to-foot direction from the cardiac image.

It should be understood that the number of the first reconstruction region(s) may be one or more, and the number of the selected first reconstruction region is not defined according to the present disclosure.

Motions of cardiac tissues at different reconstruction positions (in the head-to-foot direction) are different due to non-uniformity of motions of various parts of a heart. Thus there are disadvantages such as motion artifact and cardiac vascular discontinuity when the cardiac image is reconstructed in the same phase. According to an example of the present disclosure, a doctor may select a first reconstruction region from the cardiac image obtained by block 102 to reconstruct an image of the selected region. Before the image reconstruction of the selected region, a reconstruction phase of each reconstruction pixel in said first reconstruction region is determined bases on a conjunction of the electrocardiogram obtained from block 101 and a specific position of the first reconstruction region. The implementation is as following.

In block 201, intervals of the first reconstruction region are acquired, wherein the intervals include a first number of first reconstruction intervals not next to each other and a second number of first transition intervals between the adjacent first reconstruction intervals;

In block 202, reconstruction phases of the first reconstruction intervals determined based on the electrocardiogram data are acquired; and In block 203, based on the reconstruction phases of the first reconstruction intervals and a reconstruction position of the first transition interval, a reconstruction phase of each reconstruction pixel in the first transition interval is determined.

Specifically, in the case that the first number of the first reconstruction intervals in block 201 are divided along a direction from the head to the feet of the patient, the reconstruction phase $I_{V1W1X1}$ of each reconstruction pixel in the first transition interval is determined in block 203 by using the following interpolation formula:

$$I_{V1W1X1} = V1 + (Lx1 - Lv1) \times \frac{V1 - W1}{Lv1 - Lw1}, \quad (1)$$

wherein V1 is a reconstruction phase of a first reconstruction interval that is next to the first transition interval and in the direction towards the head of the patient; W1 is a reconstruction phase of a first reconstruction interval that is next to the first transition interval and in the direction towards the foot of the patient; Lv1 is a critical position of the first transition interval containing a current reconstruction pixel closer to the head of the patient; Lw1 is a critical position of the first transition interval containing the current reconstruction pixel closer to the feet of the patient; and Lx1 is a reconstruction position of the current reconstruction pixel.

To facilitate understanding of the above-described blocks 201 to 203, an example is provided as follows.

Figure 2:
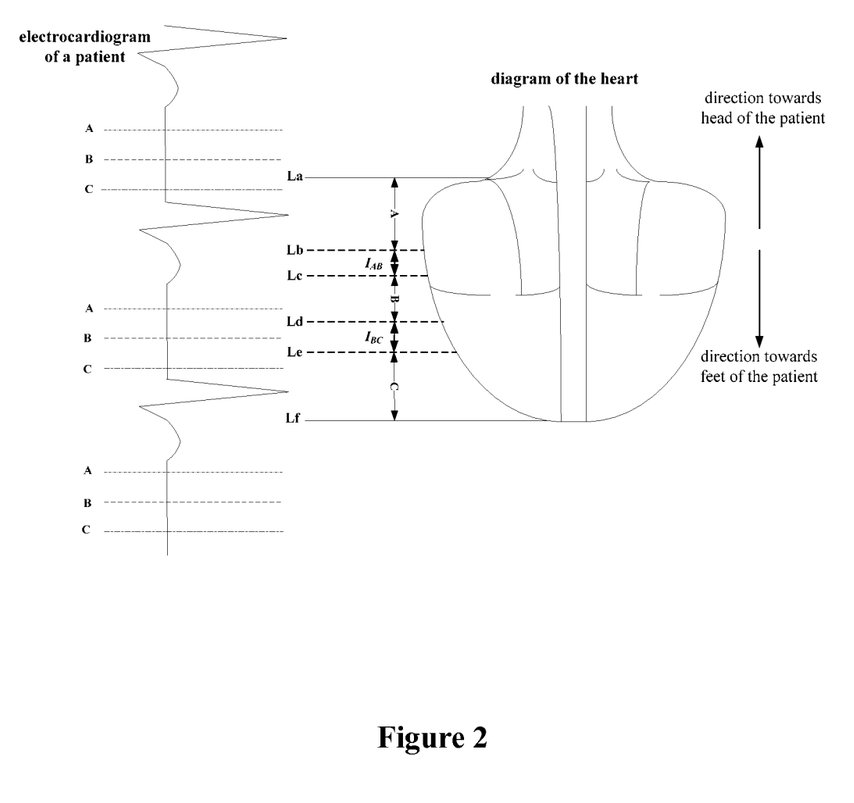
FIG. 2 is a first schematic diagram of a reconstruction region and a reconstruction phase according to an example of the present disclosure.

In a first schematic diagram of the reconstruction region and the reconstruction phase as shown in FIG. 2, the electrocardiogram of the patient recorded during scanning is on the left side of the diagram, and a schematic diagram of a heart of the patient is on the right side of the diagram. It is assumed that the first reconstruction region is the entire cardiac image which includes three first reconstruction intervals La to Lb, Lc to Ld and Le to Lf, and two first transition intervals Lb to Lc, and Ld to Le. A, B and C correspond to three different phases respectively during cardiac motion, wherein A is a reconstruction phase of the interval La to Lb, B is a reconstruction phase of the interval Lc to Ld, and C is a reconstruction phase of the interval Le to Lf. To ensure a smooth transition of phase information between different reconstruction positions and prevent a sudden position deviation and vascular rupture in the images, the first transition intervals Lb to Lc, and Ld to Le are arranged between each two adjacent first reconstruction intervals. In a first transition region, reconstruction phases at different reconstruction positions are obtained by means of interpolation, wherein interpolation methods may include linear interpolation and polynomial interpolation, etc. In the present disclosure, linear interpolation is taken as an example, V1=A, W1=B, Lv1=Lb, Lw1=Lc are used into the above-described formula (1), then a reconstruction phase $I_{ABX}$ of a reconstruction pixel at an any reconstruction position Lx1 in the first transition interval Lb to Lc can be represented as:

$$I_{ABX} = A + (Lx1 - Lb) \times \frac{A - B}{Lb - Lc} \quad (2)$$

V1=B, W1=C, Lv1=Ld, Lw1=Le are used into the above-described formula (1), a reconstruction phase $I_{BCX}$ of a reconstruction pixel at an any reconstruction position Lx1 in the first transition interval Ld to Le can be represented as:

$$I_{BCX} = B + (Lx1 - Ld) \times \frac{B - C}{Ld - Le} \quad (3)$$

It should be understood that any number of different cardiac image positions may be selected for the same patient to reconstruct the cardiac image. A range of a reconstruction region and a reconstruction phase of the reconstruction region may be changed as desired in practice.

block 104, based on the reconstruction phase of each reconstruction pixel, second projection data related to the reconstruction pixel in the reconstruction phase are selected from said collected projection data, and an image of the reconstruction pixel is reconstructed based on the second projection data.

The cardiac projection data selection is required to be performed pixel by pixel because the pixels may have different reconstruction phases. In an example, once the phases of the reconstruction pixels in some regions of the cardiac image are adjusted in block 103, and the reconstruction phase of each reconstruction pixel is obtained, a cardiac image having various phases can be acquired by reconstructing an image of each reconstruction pixel. Implementation of block 104 may be as follows.

For each reconstruction pixel, a projection data range related to the reconstruction pixel from said collected projection data is selected; and a second projection data temporally corresponding to the reconstruction phase of the reconstruction pixel are further selected from the projection data range; then an image of the reconstruction pixel is reconstructed based on the second projection data.

In an example, the implementation of block 104 is provided as follows.

Figure 5:
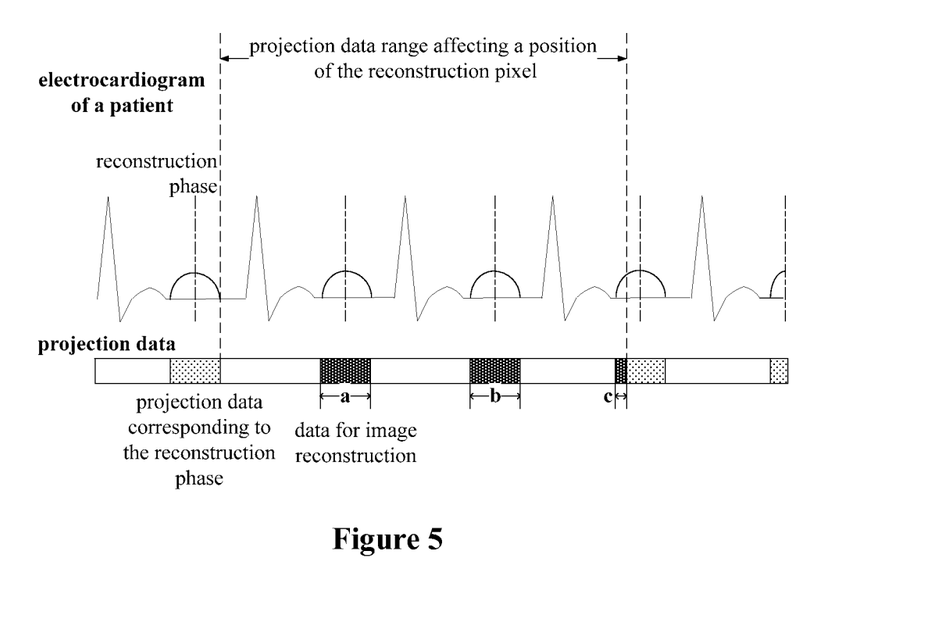
FIG. 5 is a schematic diagram of acquisition of projection data according to an example of the present disclosure.

Referring to a schematic diagram of acquisition of projection data as shown in FIG. 5. For any one of the reconstruction pixels, a reconstruction phase of the reconstruction pixel is determined according to block 103, and a spatial position of the reconstruction pixel in the patient's heart is determined According to FIG. 5, a period during which the reconstruction phase of the reconstruction pixel exists can be determined based on the electrocardiogram of the patient (There is the reconstruction phase in each cardiac cycle. In order to acquire enough projection data to reconstruct the image of the pixel, the period in the semicircle in the diagram may be selected as the period corresponding to the reconstruction phase). Then the period of the electrocardiogram data collection is matched with periods of said collected projection data, to obtain a period of said collected projection data corresponding to the period of the electrocardiogram data collection in the reconstruction phase, and corresponding projection data collected in the period in the projection data collection (i.e., the projection data within the box) is acquired. In practice, during CT scanning, the reconstruction pixel may not be scanned all times. Therefore, a projection data range when the projection data affect a position of the reconstruction pixel is selected from the projection data, then the projection data for the reconstruction phase is selected from the projection data range, for example, the block regions a, b and c in the diagram, and these projection data are used as the second projection data for image reconstruction for the reconstruction pixel.

Moreover, a projection angle for the computed tomographic scanning meets the following condition:

$$Max\beta - Min\beta \geq \pi + \gamma_{FanAngle},$$

wherein $Max\beta$ represents a maximum value of a projection angle when the second projection data is acquired, $Min\beta$ represents a minimum value of the projection angle when the second projection data is acquired, and $\gamma_{FanAngle}$ is a fan angle of a fan-shaped X-ray beam.

For example, as shown in FIG. 5, the projection angle for the computed tomographic scanning meets the following condition:

$$Max(\beta_a, \beta_b, \beta_c) - Min(\beta_a, \beta_b, \beta_c) + \pi + \gamma_{FanAngle},$$

where $Max(\beta_a, \beta_b, \beta_c)$ represents a maximum value of the projection angle when the three pieces of data a, b and c are acquired, $Min(\beta_a, \beta_b, \beta_c)$ represents a minimum value of the projection angle when the three pieces of data a, b and c are acquired, and $\gamma_{FanAngle}$ is a fan angle of a fan-shaped X-ray beam. The meaning of the above formula is that, the selected data projection angle range should be greater than a sum of a central angle of a semicircle and the fan angle, so as to reach a minimum angle range for reconstructing a cardiac image. It should be noted that the above formula is fit for a projection condition of fan-shaped or conical X-rays. There may be different formulas for other conditions as long as an angle range of projection data meets a data range required for reconstructing a cardiac image.

Figure 3:
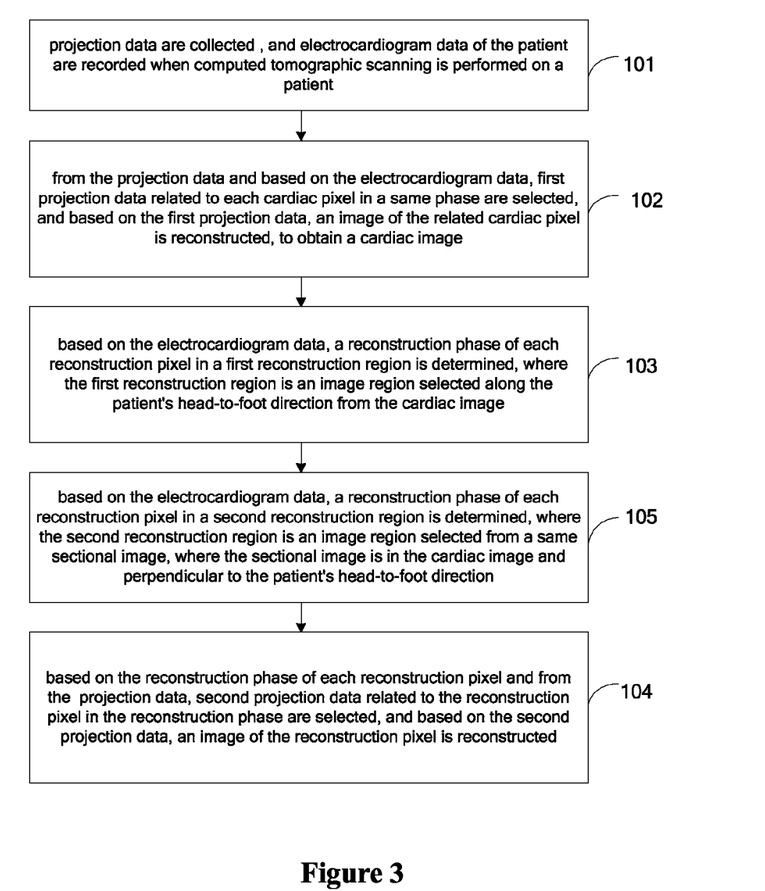
FIG. 3 is a second schematic flowchart of a method for reconstructing a cardiac image according to another example of the present disclosure.

Furthermore, based on a nature of cardiac motion, best observation phases for a coronary artery and for other cardiac tissues at a same heart rate in a same scanning reconstruction are different. For example, at some heart rates, a best reconstruction phase of a left coronary artery is in cardiac diastole (a relative phase is about 75%), and a best reconstruction phase of a right coronary artery is in cardiac systole (a relative phase is about 40%). Thus, a single phase reconstruction can not simultaneously represent best reconstruction results of all coronary arteries. To alleviate this problem, a method for adjusting reconstruction phases in different regions in a same sectional image is also provided according to another example of the present disclosure. Accordingly, reference is made to the second schematic flowchart of the method for reconstructing the cardiac image as shown in FIG. 3, and the example of the present disclosure may include block 105 between block 103 and block 104.

In block 105, a reconstruction phase of each reconstruction pixel in a second reconstruction region is determined based on the electrocardiogram data, wherein the second reconstruction region is an image region selected from a same sectional image and said sectional image is in the cardiac image and perpendicular to the patient's head-to-foot direction.

It should be understood that the number of the second reconstruction region may be one or more, and the number of the selected second reconstruction region is not defined according to the present disclosure.

In an example of the present disclosure, the implementation of block 105 may include block 301 to 303.

In block 301, intervals of the second reconstruction region are acquired, wherein the intervals include a second reconstruction interval which is determined based on the electrocardiogram data, and a second transition interval surrounding the second reconstruction interval.

In block 302, a reconstruction phase of the second reconstruction interval is acquired.

In block 303, based on the reconstruction phase of the second reconstruction interval, a phase of the sectional image and a reconstruction position of the second transition interval, a reconstruction phase of each reconstruction pixel in the second transition interval is determined.

More specifically, in the case that the second reconstruction region and the second reconstruction interval are concentric circles, the reconstruction phase $I_{V2W2X2}$ of each reconstruction pixel in the second transition interval is determined by using the following interpolation formula:

$$I_{V2W2X2} = V2 + (Rx2 - R_{V2}) \times \frac{V2 - W2}{R_{V2} - R_{W2}}, \quad (4)$$

wherein $V^2$ is the reconstruction phase of the second reconstruction interval, W2 is the phase of the tomographic image, RV2 is a radius of the second reconstruction interval, $R_{W2}$ is a radius of the second reconstruction region, and Rx2 is a distance from the reconstruction pixel to the center of the concentric circles.

In order to facilitate understanding of the above-described block 301 to 303, an example is provided as follows.

Figure 4:
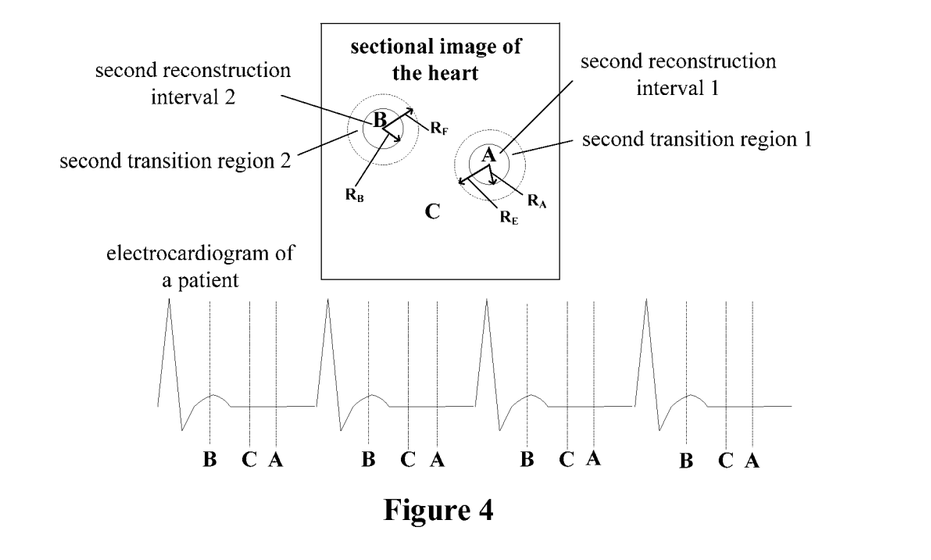
FIG. 4 is a second schematic diagram of a reconstruction region and a reconstruction phase according to another example of the present disclosure.

In a second schematic diagram of the reconstruction region and the reconstruction phase as shown in FIG. 4, a circular region is taken as an example (the region may be a dot or a region of other shape, and the number of the regions may also be set by a doctor), an upper half of the diagram is a sectional image (the sectional image is a sectional image in a direction perpendicular to the head-to-foot direction of the patient and is selected from the cardiac image reconstructed in block 102), and a lower half of the view is an electrocardiogram of the patient. It is assumed that a second reconstruction region 1 and another second reconstruction region 2 are selected from the sectional image, and the second reconstruction regions are respectively a region surrounded by a dashed circle in the diagram. The second reconstruction region 1 includes a second reconstruction interval 1 (a region surrounded by a solid circle) and a second transition region 1 (an annular region between the solid circle and the dashed circle), and the second reconstruction region 2 includes a second reconstruction interval 2 (a region surrounded by a solid circle) and a second transition region 2 (an annular region between the solid circle and the dashed circle). A, B and C correspond to three different phases during the cardiac movement, wherein C is a reconstruction phase of the sectional image obtained by performing block 103. A is a reconstruction phase of the second reconstruction interval 1. B is a reconstruction phase of the second reconstruction interval 2. A radius of the second reconstruction interval 1 is $R_A$, a radius of the second reconstruction region 1 is $R_E$, a radius of the second reconstruction interval 2 is $R_B$, and a radius of the second reconstruction region 2 is $R_F$.

V2=A, W2=C, $R_{V2}=R_A$, $R_{W2}=R_E$ are used into the above-described formula (4), the reconstruction phase $I_{ACX}$ of an any reconstruction pixel in the second transition interval 1 can be represented as:

$$I_{ACX} = A + (Rx2 - R_A) \times \frac{A - C}{R_A - R_E} \quad (5)$$

wherein Rx2 is a distance from a certain reconstruction pixel in the second transition interval 1 to the center of the circle.

V2=B, W2=C, $R_{V2}=R_B$ $R_{W2}=R_F$ are used into the above-described formula (4), a reconstruction phase $I_{BCX}$ of an any reconstruction pixel in the second transition interval 2 may be represented as:

$$I_{BCX} = B + (Rx2 - R_B) \times \frac{B - C}{R_B - R_F} \quad (6)$$

wherein Rx2 is a distance from a certain reconstruction pixel in the second transition interval 2 to the center of the circle.

The reconstruction phase A or B of the second reconstruction interval can be transited smoothly to the phase C of the sectional image by the above formulas. It can be seen that the reconstruction pixels in the second transition region 1 and the second transition region 2 may have different reconstruction phases. In order to prevent a severe image distortion or dislocation between the second reconstruction region and the sectional image region, the second transition interval should not be too small and the difference between the reconstruction phases of the second transition region and the sectional image region should not be too great.

According to the method for reconstructing the cardiac image of the present disclosure, on the basis of a cardiac image reconstructed in a same phase, a reconstruction phases of various reconstruction pixels in different reconstruction regions in the cardiac image are adjusted in conjunction with the electrocardiogram data, then corresponding CT projection data are selected based on the reconstruction phase of each reconstruction pixel, subsequently image reconstruction is performed on each reconstruction pixel based on the CT projection data, and finally the image reconstruction for each pixel in the reconstruction region is accomplished. In this way, the reconstruction is performed with various phases for various cardiac image positions, which better conforms to the physiological nature of cardiac motion, and is beneficial to alleviate motion artifact in the image, and thus a more accurate reconstructed cardiac image is obtained.

Figure 6:
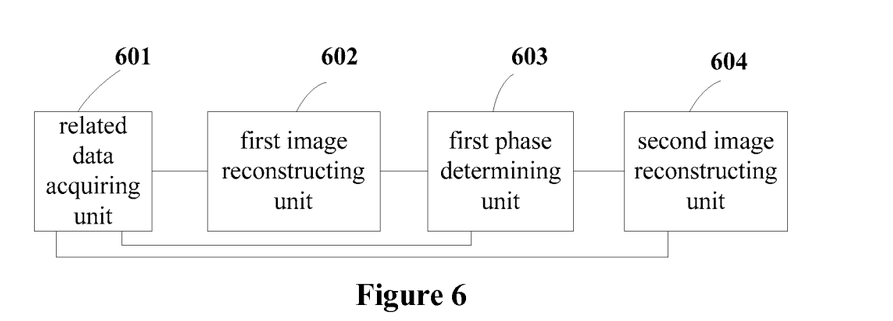
FIG. 6 is a first schematic structural diagram of an apparatus for reconstructing a cardiac image according to an example of the present disclosure.

Reference is made to FIG. 6, which is a first schematic structural diagram of logic of an apparatus for reconstructing a cardiac image according to an example of the present disclosure. Said logic is stored on a non-transitory computer readable storage medium. The apparatus includes the non-transitory computer readable storage medium and a processor. Based on the function, the logic includes a related data acquiring unit 601, a first image reconstructing unit 602, a first phase determining unit 603, and a second image reconstructing unit 604. Said processor executes the instructions of the corresponding unit of the logic to:

collect projection data and record electrocardiogram data when computed tomographic scanning is performed on a patient.

select first projection data from said collected projection data related to each cardiac pixel with a same phase based on the electrocardiogram data, and then obtain a cardiac image based on the first projection data;

determine, based on the electrocardiogram data, a reconstruction phase of each reconstruction pixel in a first reconstruction region, where the first reconstruction region is an image region selected along the patient's head-to-foot direction from the cardiac image.

select, based on the reconstruction phase of each reconstruction pixel and from the projection data, second projection data related to the reconstruction pixel in the reconstruction phase, and reconstruct, based on the second projection data, an image of the reconstruction pixel.

Specifically, the first phase determining unit 603 includes: a first interval acquiring sub-unit, a first phase determining sub-unit, and a second phase determining sub-unit. Said processor executes the instructions of the corresponding unit of the logic to:

acquire intervals of the first reconstruction region, where the intervals include a first number of first reconstruction intervals not next to each other, and a second number of first transition intervals between the adjacent first reconstruction intervals.

acquire reconstruction phases of the first reconstruction intervals determined based on the electrocardiogram data.

determine, based on the reconstruction phases of the first reconstruction intervals and a reconstruction position of the first transition interval, a reconstruction phase of each reconstruction pixel in the first transition interval.

In a case that the first number of the first reconstruction intervals are divided in a direction along the head to the feet of the patient, the second phase determining sub-unit determines the reconstruction phase $I_{V1W1X1}$ of each reconstruction pixel in the first transition interval by using the following interpolation formula:

$$I_{V1W1X1} = V1 + (Lx1 - Lv1) \times \frac{V1 - W1}{Lv1 - Lw1},$$

where V1 is a reconstruction phase of a first reconstruction interval that is next to the first transition interval and in the direction towards the head of the patient; W1 is a reconstruction phase of a first reconstruction interval that is next to the first transition interval and in the direction towards the foot of the patient; Lv1 is a critical position, closer to the head of the patient, of the first transition interval containing a current reconstruction pixel; Lw1 is a critical position, closer to the feet of the patient, of the first transition interval containing the current reconstruction pixel; and Lx1 is a reconstruction position of the current reconstruction pixel.

Specifically, the second image reconstructing unit 604 includes a data range selecting sub-unit and a pixel image reconstructing sub-unit. Said processor executes the instructions of the corresponding unit of the logic to:

select a projection data range related to the reconstruction pixel from the projection data; and select, from the projection data range, second projection data temporally corresponding to the reconstruction phase of the reconstruction pixel, and reconstruct, based on the second projection data, an image of the reconstruction pixels.

Figure 7:
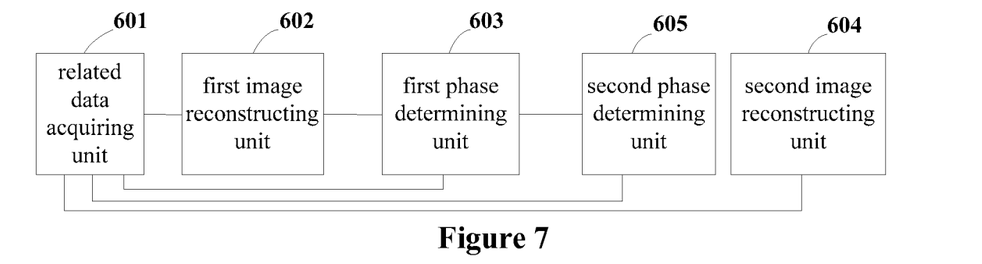
FIG. 7 is a second schematic structural diagram of an apparatus for reconstructing a cardiac image according to another example of the present disclosure.

Reference is made to FIG. 7, which is a second schematic structural diagram of logic of an apparatus for reconstructing a cardiac image according to an example of the present disclosure. The logic is stored on a non-transitory computer readable storage medium. The apparatus includes the non-transitory computer readable storage medium and a processor. Based on the function, the logic according to the example further includes a second phase determining unit 605 besides the units as shown in FIG. 6.

After the first phase determining unit determines, based on the electrocardiogram data, a reconstruction phase of each reconstruction pixel in a first reconstruction region, said processor executes the instructions of the corresponding unit of the logic to: determine, based on the electrocardiogram data, a reconstruction phase of each reconstruction pixel in a second reconstruction region, where the second reconstruction region is an image region selected from a same sectional image, where the sectional image is in the cardiac image and perpendicular to the patient's head-to-foot direction.

Specifically, the second phase determining unit 605 includes: a second interval acquiring unit, a third phase determining sub-unit, and a fourth phase determining sub-unit. Said processor executes the instructions of the corresponding unit of the logic to:

acquire intervals of the second reconstruction region, where the intervals include a second reconstruction interval and a second transition interval surrounding the second reconstruction interval.

acquire a reconstruction phase of the second reconstruction interval determined based on the electrocardiogram data.

determine, based on the reconstruction phase of the second reconstruction interval, a phase of the sectional image and a reconstruction position of the second transition interval, a reconstruction phase of each reconstruction pixel in the second transition interval.

In the case that the second reconstruction region and the second reconstruction interval are concentric circles, the fourth phase determining sub-unit determines the reconstruction phase $I_{V2W2X2}$ of each reconstruction pixel in the second transition interval by using the following interpolation formula:

$$I_{V2W2X2} = V2 + (Rx2 - R_{V2}) \times \frac{V2 - W2}{R_{V2} - R_{W2}},$$

where V2 is the reconstruction phase of the second reconstruction interval, W2 is the phase of the tomographic image, RV2 is a radius of the second reconstruction interval, $R_{W2}$ is a radius of the second reconstruction region, and Rx2 is a distance from the reconstruction pixel to the center of the concentric circles.

According to the logic for reconstructing the cardiac image according to the example of the present disclosure, on the basis of a cardiac image reconstructed in a same phase, reconstruction phases of various reconstruction pixels in different reconstruction regions in the cardiac image are adjusted in conjunction with the electrocardiogram data, corresponding CT projection data are selected based on the reconstruction phase of each reconstruction pixel, image reconstruction is performed on each reconstruction pixel based on the CT projection data, and the image reconstruction for each pixel in the reconstruction region is accomplished. In this way, the reconstruction is performed with various phases for various cardiac image positions, which better conforms to the physiological nature of cardiac motion, and is beneficial to alleviate motion artifact in the image, and thus a more accurate reconstructed cardiac image is obtained.

A non-transitory computer readable storage medium storing instructions is also provided. When executed by a processor, the instructions cause the processor to:

collect projection data and record electrocardiogram data when computed tomographic scanning is performed on a patient;

select, from the projection data and based on the electrocardiogram data, first projection data related to each cardiac pixel and in a same phase, and reconstruct, based on the first projection data, an image of the related cardiac pixel, to obtain a cardiac image;

determine, based on the electrocardiogram data, a reconstruction phase of each reconstruction pixel in a first reconstruction region, wherein the first reconstruction region is an image region selected along the patient's head-to-foot direction from the cardiac image; and select, based on the reconstruction phase of each reconstruction pixel and from the projection data, second projection data related to the reconstruction pixel in the reconstruction phase, and reconstruct, based on the second projection data, an image of the reconstruction pixel.

It can be seen from the description of the above examples, those skilled in the art can understand clearly that all or some parts of the above-described examples of the method may be implemented by software plus a necessary general hardware platform. Based on this understanding, essence of technical solutions of the disclosure or contribution to the art may be embodied in the form of a software product. The computer software product may be stored in a storage medium such as a ROM/RAM, a magnetic disk, and an optical disk, containing instructions to instruct a computer device (may be a personal computer, a server, or a network communication device such as a media gateway, etc) to execute methods in the examples of the present disclosure or parts of the examples.

It should be noted that, the examples of the present disclosure are described herein in a progressive manner, with an emphasis placed on explaining the difference between each example and the other examples; hence, the same or similar parts among the examples can refer to one another. For the apparatus disclosed in the examples, the corresponding description is relatively brief because the apparatus corresponds to the method disclosed in the examples. The relevant portions may be referred to the description for the method.

It should further be noted that, in the present disclosure, relational terms such as "first" and "second" are used merely to distinguish one entity or operation from the other entity or operation, but not necessarily demand or imply that there is actually such a relation or order among these entities and operations. Furthermore, the terms "including", "comprising", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, unless particularly limited, the element defined by the wording "include(s) a . . . " does not exclude a case that the process, method, article or device includes other same elements.

The above description of the examples disclosed herein enables those skilled in the art to implement or use the present disclosure. Modifications to the examples may be obvious to those skilled in the art. The general principle herein can be implemented in other examples without deviating from the spirit or scope of the present disclosure. Therefore, the present disclosure is not limited to the examples described herein, but in accordance with the widest scope consistent with the principle and novel features disclosed herein.

The invention claimed is:

1. A method for reconstructing a cardiac image, comprising:
   collecting projection data and recording electrocardiogram data when computed tomographic scanning is performed on a patient;
   selecting, based on the electrocardiogram data, first projection data related to each cardiac pixel with a same phase from the projection data, and then obtaining a cardiac image by reconstructing an image of the related cardiac pixel based on the first projection data;
   determining a reconstruction phase of each reconstruction pixel in a first reconstruction region based on the electrocardiogram data, wherein the first reconstruction region is an image region selected along the patient's head-to-foot direction from the cardiac image; and
   selecting, based on the reconstruction phase of each reconstruction pixel, second projection data related to the reconstruction pixel with the reconstruction phase from the projection data, and then reconstructing an image of the reconstruction pixel based on the second projection data; wherein
   the determining a reconstruction phase of each reconstruction pixel in a first reconstruction region based on the electrocardiogram data, comprises:
   acquiring intervals of the first reconstruction region, wherein the intervals comprise a first number of first reconstruction intervals not next to each other, and a second number of first transition intervals between the adjacent first reconstruction intervals:
   acquiring reconstruction phases of the first reconstruction intervals determined based on the electrocardiogram data;
   determining, based on the reconstruction phases of the first reconstruction intervals and a reconstruction position of the first transition interval, a reconstruction phase of each reconstruction pixel in the first transition interval; and wherein
   in the case that the first number of the first reconstruction intervals are divided along a direction from the head to the feet of the patient, the reconstruction phase $I_{V1W1X1}$ of each reconstruction pixel in the first transition interval is determined by using the following interpolation formula:

$$I_{V1W1X1} = V1 + (Lx1 - Lv1) \times \frac{V1 - W1}{Lv1 - Lw1},$$

wherein V1 is a reconstruction phase of a first reconstruction interval that is next to the first transition interval and in the direction towards the head of the patient; W1 is a reconstruction phase of a first reconstruction interval that is next to the first transition interval and in the direction towards the foot of the patient; Lv1 is a critical position, closer to the head of the patient, of the first transition interval containing a current reconstruction pixel; Lw1 is a critical position, closer to the feet of the patient, of the first transition interval containing the current reconstruction pixel; and Lx1 is a reconstruction position of the current reconstruction pixel.

2. The method according to claim 1, after the determining a reconstruction phase of each reconstruction pixel in a first reconstruction region based on the electrocardiogram data, further comprising:
   determining, based on the electrocardiogram data, a reconstruction phase of each reconstruction pixel in a second reconstruction region, wherein the second reconstruction region is an image region selected from a same sectional image and said sectional image is in the cardiac image and perpendicular to the patient's head-to-foot direction.

3. The method according to claim 2, wherein the determining a reconstruction phase of each reconstruction pixel in a second reconstruction region based on the electrocardiogram data, comprises:
   acquiring intervals of the second reconstruction region, wherein the intervals comprise a second reconstruction interval and a second transition interval surrounding the second reconstruction interval;
   acquiring a reconstruction phase of the second reconstruction interval determined based on the electrocardiogram data; and
   determining, based on the reconstruction phase of the second reconstruction interval, a phase of the sectional image and a reconstruction position of the second transition interval, a reconstruction phase of each reconstruction pixel in the second transition interval.

4. The method according to claim 3, wherein in the case that the second reconstruction region and the second reconstruction interval are concentric circles, the reconstruction phase $I_{V2W2X2}$ of each reconstruction pixel in the second transition interval is determined by using the following interpolation formula:

$$I_{V2W2X2} = V2 + (Rx2 - R_{V2}) \times \frac{V2 - W2}{R_{V2} - R_{W2}},$$

wherein V2 is the reconstruction phase of the second reconstruction interval, W2 is the phase of the tomographic image, $R_{V2}$ is a radius of the second reconstruction interval, $R_{W2}$ is a radius of the second reconstruction region, and Rx2 is a distance from the reconstruction pixel to the center of the concentric circles.

5. The method according to claim 1, wherein the selecting, based on the reconstruction phase of each reconstruction pixel and from the projection data, second projection data related to the reconstruction pixel in the reconstruction phase, comprises:
   selecting a projection data range related to the reconstruction pixel from the projection data; and
   selecting, from the projection data range, second projection data temporally corresponding to the reconstruction phase of the reconstruction pixel.

6. The method according to claim 5, wherein a projection angle for the computed tomographic scanning meets the following condition:

Maxβ−Minβ≥π+$γ_{FanAngle}$, wherein Maxβ represents a maximum value of a projection angle when the second projection data is acquired, Minβ represents a minimum value of the projection angle when the second projection data is acquired, and $γ_{FanAngle}$ is a fan angle of a fan-shaped X-ray beam.

7. An apparatus for reconstructing a cardiac image comprising a processor and a non-transitory computer readable storage medium storing instructions, wherein when executed by the processor, the instructions cause the apparatus to:

collect projection data and record electrocardiogram data when computed tomographic scanning is performed on a patient;

select, from the projection data and based on the electrocardiogram data, first projection data related to each cardiac pixel and in a same phase, and reconstruct, based on the first projection data, an image of the related cardiac pixel, to obtain a cardiac image;

determine, based on the electrocardiogram data, a reconstruction phase of each reconstruction pixel in a first reconstruction region, wherein the first reconstruction region is an image region selected along the patient's head-to-foot direction from the cardiac image; and select, based on the reconstruction phase of each reconstruction pixel and from the projection data, second projection data related to the reconstruction pixel in the reconstruction phase, and reconstruct, based on the second projection data, an image of the reconstruction pixel; wherein the determine, based on the electrocardiogram data, a reconstruction phase of each reconstruction pixel in a first reconstruction region, comprises:

acquire intervals of the first reconstruction region, wherein the intervals comprise a first number of first reconstruction intervals not next to each other, and a second number of first transition intervals between the adjacent first reconstruction intervals:

acquire reconstruction phases of the first reconstruction intervals determined based on the electrocardiogram data;

determine, based on the reconstruction phases of the first reconstruction intervals and a reconstruction position of the first transition interval, a reconstruction phase of each reconstruction pixel in the first transition interval; wherein in a case that the first number of the first reconstruction intervals are divided in a direction along the head to the feet of the patient, the reconstruction phase $I_{V1W1X1}$ of each reconstruction pixel in the first transition interval is determined by using the following interpolation formula:

$$I_{V1W1X1} = V1 + (Lx1 - Lv1) \times \frac{V1 - W1}{Lv1 - Lw1},$$

wherein V1 is a reconstruction phase of a first reconstruction interval that is next to the first transition interval and in the direction towards the head of the patient; W1 is a reconstruction phase of a first reconstruction interval that is next to the first transition interval and in the direction towards the foot of the patient; Lv1 is a critical position, closer to the head of the patient, of the first transition interval containing a current reconstruction pixel; Lw1 is a critical position, closer to the feet of the patient, of the first transition interval containing the current reconstruction pixel; and Lx1 is a reconstruction position of the current reconstruction pixel.

8. The apparatus according to claim 7, after the determine, based on the electrocardiogram data, a reconstruction phase of each reconstruction pixel in a first reconstruction region, the apparatus being further configured to:

determine, based on the electrocardiogram data, a reconstruction phase of each reconstruction pixel in a second reconstruction region, wherein the second reconstruction region is an image region selected from a same sectional image, wherein the sectional image is in the cardiac image and perpendicular to the patient's head-to-foot direction.

9. The apparatus according to claim 8, wherein the determine, based on the electrocardiogram data, a reconstruction phase of each reconstruction pixel in a second reconstruction region, comprises:

acquire intervals of the second reconstruction region, wherein the intervals comprise a second reconstruction interval and a second transition interval surrounding the second reconstruction interval;

acquire a reconstruction phase of the second reconstruction interval determined based on the electrocardiogram data; and determine, based on the reconstruction phase of the second reconstruction interval, a phase of the sectional image and a reconstruction position of the second transition interval, a reconstruction phase of each reconstruction pixel in the second transition interval.

10. The apparatus according to claim 9, wherein in a case that the second reconstruction region and the second reconstruction interval are concentric circles, the reconstruction phase $I_{V2W2X2}$ of each reconstruction pixel in the second transition interval is determined by using the following interpolation formula:

$$I_{V2W2X2} = V2 + (Rx2 - R_{V2}) \times \frac{V2 - W2}{R_{V2} - R_{W2}},$$

wherein V2 is the reconstruction phase of the second reconstruction interval, W2 is the phase of the tomographic image, $R_{V2}$ is a radius of the second reconstruction interval, $R_{W2}$ is a radius of the second reconstruction region, and Rx2 is a distance from the reconstruction pixel to the center of the concentric circles.

11. The apparatus according to claim 7 wherein the select, based on the reconstruction phase of each reconstruction pixel and from the projection data, second projection data related to the reconstruction pixel in the reconstruction phase, comprises, select a projection data range related to the reconstruction pixel from the projection data; and select, from the projection data range, second projection data temporally corresponding to the reconstruction phase of the reconstruction pixel, and reconstruct, based on the second projection data, an image of the reconstruction pixels.

12. A non-transitory computer readable storage medium storing instructions, wherein when executed by a processor, the instructions cause the processor to:

collect projection data and record electrocardiogram data when computed tomographic scanning is performed on a patient;

select, from the projection data and based on the electrocardiogram data, first projection data related to each cardiac pixel and in a same phase, and reconstruct, based on the first projection data, an image of the related cardiac pixel, to obtain a cardiac image;

determine, based on the electrocardiogram data, a reconstruction phase of each reconstruction pixel in a first reconstruction region, wherein the first reconstruction region is an image region selected along the patient's head-to-foot direction from the cardiac image; and select, based on the reconstruction phase of each reconstruction pixel and from the projection data, second projection data related to the reconstruction pixel in the reconstruction phase, and reconstruct, based on the second projection data, an image of the reconstruction pixel; wherein the determine, based on the electrocardiogram data, a reconstruction phase of each reconstruction pixel in a first reconstruction region, comprises:

acquire intervals of the first reconstruction region, wherein the intervals comprise a first number of first reconstruction intervals not next to each other, and a second number of first transition intervals between the adjacent first reconstruction intervals;

acquire reconstruction phases of the first reconstruction intervals determined based on the electrocardiogram data;

determine, based on the reconstruction phases of the first reconstruction intervals and a reconstruction position of the first transition interval, a reconstruction phase of each reconstruction pixel in the first transition interval; wherein in a case that the first number of the first reconstruction intervals are divided in a direction along the head to the feet of the patient, the reconstruction phase $I_{V1W1X1}$ of each reconstruction pixel in the first transition interval is determined by using the following interpolation formula:

$$I_{V1W1X1} = V1 + (Lx1 - Lv1) \times \frac{V1 - W1}{Lv1 - Lw1},$$

wherein V1 is a reconstruction phase of a first reconstruction interval that is next to the first transition interval and in the direction towards the head of the patient; W1 is a reconstruction phase of a first reconstruction interval that is next to the first transition interval and in the direction towards the foot of the patient; Lv1 is a critical position, closer to the head of the patient, of the first transition interval containing a current reconstruction pixel; Lw1 is a critical position, closer to the feet of the patient, of the first transition interval containing the current reconstruction pixel; and Lx1 is a reconstruction position of the current reconstruction pixel.

* * * * *